US008677477B2

(12) United States Patent
Kim et al.

(10) Patent No.: US 8,677,477 B2
(45) Date of Patent: Mar. 18, 2014

(54) APPLICATION PROGRAM LAUNCHING METHOD AND SYSTEM FOR IMPROVING SECURITY OF EMBEDDED LINUX KERNEL

(75) Inventors: Kang-Hee Kim, Yongin-si (KR);
Dong-Hyouk Lim, Daejeon (KR);
Yong-Bon Koo, Deajeon (KR);
Yung-Joon Jung, Daejeon (KR);
Yong-Gwan Lim, Daejeon (KR);
Jae-Myoung Kim, Daejeon (KR)

(73) Assignees: Samsung Electronics Co., Ltd.,
Suwon-si (KR); Electronics and Telecommunications Research Institute, Daejeon (KR)

( * ) Notice: Subject to any disclaimer, the term of this patent is extended or adjusted under 35 U.S.C. 154(b) by 1230 days.

(21) Appl. No.: 11/999,217

(22) Filed: Dec. 4, 2007

(65) Prior Publication Data

US 2008/0134325 A1 Jun. 5, 2008

(30) Foreign Application Priority Data

Dec. 5, 2006 (KR) .................. 10-2006-0122245
Oct. 4, 2007 (KR) .................. 10-2007-0100071

(51) Int. Cl.
*G06F 21/00* (2013.01)

(52) U.S. Cl.
USPC ........................................ 726/21; 713/164

(58) Field of Classification Search
USPC .................................................. 726/21
See application file for complete search history.

(56) References Cited

U.S. PATENT DOCUMENTS

2002/0188649 A1  12/2002  Karim
2006/0053426 A1  3/2006  Dive-Reclus et al.
2007/0050369 A1*  3/2007  Stiegler et al. ............ 707/9

FOREIGN PATENT DOCUMENTS

| CN | 1617101 A | 5/2005 |
| KR | 1020020033859 A | 5/2002 |
| KR | 1020020040482 A | 5/2002 |
| KR | 1020020075601 A | 10/2002 |
| KR | 1020060088929 A | 8/2006 |

OTHER PUBLICATIONS

European Search Report dated Aug. 18, 2011 in connection with European Patent Application No. 08 15 4727.
Office Action dated Jan. 26, 2011 in connection with Chinese Patent Application No. 2008100960833.

* cited by examiner

*Primary Examiner* — Gilberto Barron, Jr.
*Assistant Examiner* — Devin Almeida

(57) ABSTRACT

Provided is an application program launching method and system for improving security of an embedded Linux kernel by distributing superuser privileges. The method includes: searching security set information on an application program selected by a user; changing a user account for a processor of the application program to a user ID associated with the application program in the security set information; setting a capability for the processor according to setting information for the capability in the security set information; changing a basic directory for the processor according to a basic directory in the security set information; and launching the application program.

18 Claims, 6 Drawing Sheets

APPLICATION PROGRAM LAUNCHING METHOD AND SYSTEM FOR IMPROVING SECURITY OF EMBEDDED LINUX KERNEL

CROSS-REFERENCE TO RELATED APPLICATION(S) AND CLAIM OF PRIORITY

This application claims priority under 35 U.S.C. §119(a) to an application filed in the Korean Intellectual Property Office on Dec. 5, 2006 and allocated Serial No. 2006-0122245, and an application filed in the Korean Intellectual Property Office on Oct. 4, 2007 and allocated Serial No. 2007-0100071 the contents of which are incorporated herein by reference.

TECHNICAL FIELD OF THE INVENTION

The present invention relates generally to an application program launching method and system for improving security of an embedded Linux kernel, and in particular, to an application program launching method and system for improving security of an embedded Linux kernel by distributing superuser privileges.

BACKGROUND OF THE INVENTION

As hardware processor technologies are developing, the performance of embedded systems is dramatically improved. Thus, the embedded systems can be connected to external communication devices through fixed line and mobile networks. As a general-purpose operating system such as Linux can be used in PDP and PMP devices, external programs created by users or program generators can be executed in the embedded systems. Therefore, the security of the embedded systems becomes very important.

In a general-purpose operating system such as Linux, security methods are based on a multi-user environment, such as a conventional server-client environment. In a multi-user environment, operating systems should separate user processors from system management processors in order to protect a system from users. For this purpose, the operating systems maintain a separate superuser account having most privileges required for managing the system. In a Unix type operating systems such as Linux, the superuser account is usually called root account. The root account has privileges for binding a particular port and a processor, loading a kernel module, mounting and unmounting filesystems, and various system managements.

Therefore, in conventional Linux operating systems, security methods are designed based on a user account instead of the root account. A representative example is a security kernel. The security kernel improves internal security of a kernel. That is, file access is allowed only to a user account of a user having a corresponding file, and network connection and communication between processors are allowed to a user account having corresponding privileges.

Since the embedded systems are usually operated in single user environment instead of in a multi-user environment, such as a server-client environment, one user uses the embedded systems. Thus, in the embedded system, user accounts are not needed and most processors are executed with the root account.

FIG. 1 is a block diagram illustrating an environment in which an application program is executed in an embedded system according to a conventional security method. Referring to FIG. 1, each of processors of application programs 110, 120 and 130 (hereinafter, referred to as an application program processor) is executed with the root account and can access a Linux kernel 100 without any limitation. Because the application program processors 110, 120 and 130 can exercise all of the privileges accorded to the superuser (hereinafter, referred to as superuser privileges) even when they need part of superuser privileges, or do not need superuser privileges, they can access the imbedded system unnecessarily. Therefore, it is an inefficient way and a threat to the security of the embedded system to execute an application program in the embedded system according to the conventional security method based on the multi-user environment.

SUMMARY OF THE INVENTION

To address the above-discussed deficiencies of the prior art, it is a primary object of the present invention to substantially solve at least the above problems and/or disadvantages and to provide at least the advantages below. Accordingly, an object of the present invention is to provide an application program launching method and system for enabling conventional security methods, which are used in a Linux operating system, to be used in an embedded system without modifying the conventional security methods to a large extent.

According to one aspect of the present invention, a method for launching an application program on an embedded Linux kernel includes the steps of: searching security set information on an application program selected by a user; changing a user account for a processor of the application program to a user identification (ID) associated with the application program in the security set information; setting a capability for the processor according to setting information for the capability in the security set information; changing a basic directory for the processor according to a basic directory in the security set information; and launching the application program. The method may further include, before the step of searching the security set information, the step of installing the application program. The step of installing the application program may include the steps of: assigning a user ID to an application program to be installed; configuring setting information for a capability required by the application program; and storing a security set information including the user identification (ID) and the capability in a registry.

According to another aspect of the present invention, a system for launching an application program on an imbedded Linux kernel includes: a user interface for receiving information on an application program selected by a user; a registry interface for searching security set information on the application program from a registry by communicating with a registry manager; and a controller for setting a user account, a capability, and a basic directory according to the security set information and launching a processor of the application program. The system may further include an application program installer for detecting the security set information on the application program to be installed and storing the detected security set information in the registry in the processor of installing the application program.

According to still another aspect of the present invention, a computer-readable recording medium storing a program for executing a method for launching an application program on an embedded Linux kernel, the method includes the steps of: searching security set information on an application program selected by a user; changing a user account for a processor of the application program to a user identification (ID) associated with the application program in the security set information; setting a capability for the processor according to setting information for the capability in the security set information;

changing a basic directory for the processor according to a basic directory in the security set information; and launching the application program.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION OF THE INVENTION

FIGS. 2 through 6, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged processing system.

Figure 1:
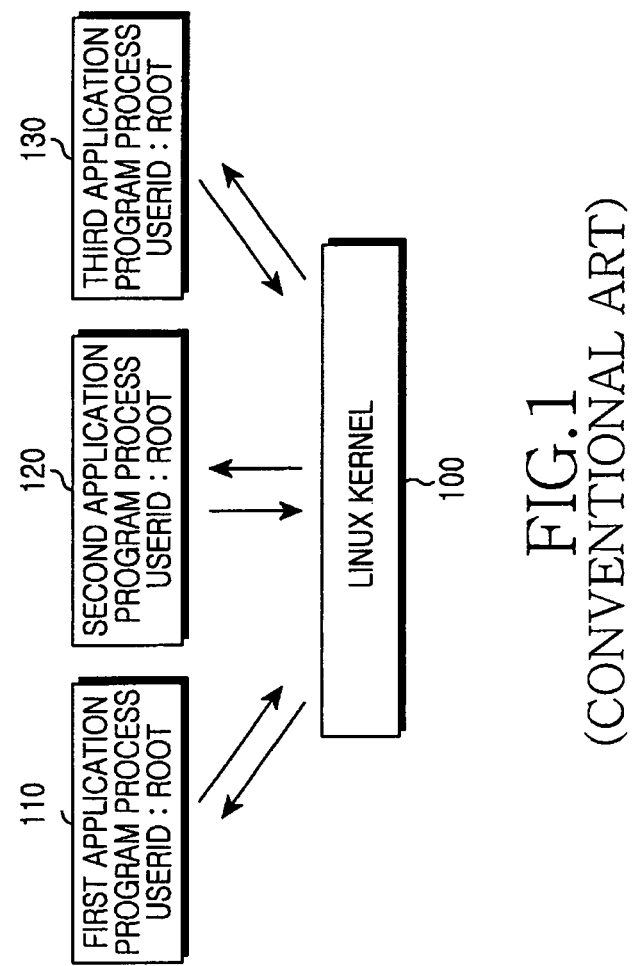
FIG. 1 is a block diagram illustrating an environment in which an application program is executed in an embedded system according to a conventional security method.
Figure 2:
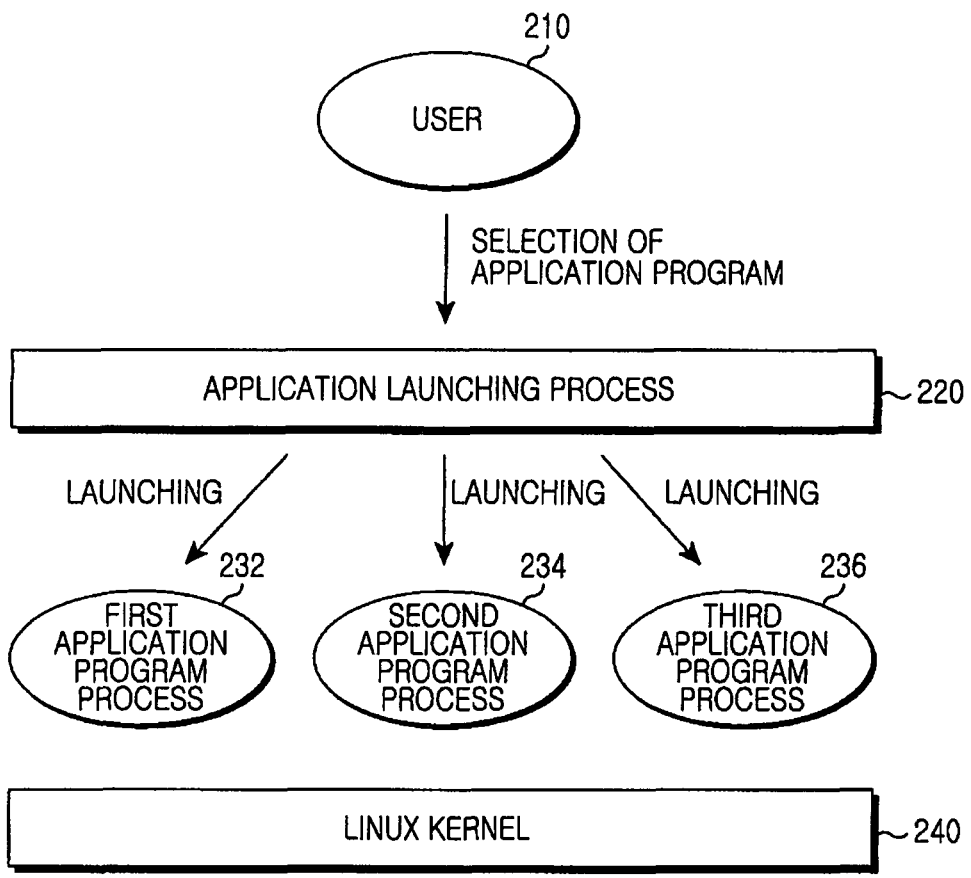
FIG. 2 is a flowchart illustrating a schematic procedure for launching an application program according to an embodiment of the present invention.

FIG. 2 is a flowchart illustrating a schematic procedure for launching an application program according to an embodiment of the present invention.

Referring to FIG. 2, using an application launching processor 220, a user 210 selects application programs to be launched.

The application launching processor 220 enables the selected application program processors 232, 234 and 236 to be launched on a Linux kernel 240.

Thus, the user 210 cannot launch the application program directly. The user 210 can launch the application program using only the application launching processor 220. In other words, the application launching processor 220 serves as an interface between the user 210 and the application program processors 232, 234 and 236. For this purpose, the application launching processor 220 may be implemented as a daemon in an embedded Linux system because it should run continually while the embedded Linux system operates. Generally, the application launching processor 220 may be implemented in a graphical user interface (GUI), and in this case it also serves as a window manager managing the background screen and icons in the embedded Linux system. Accordingly, the application launching processor 220 may be implemented by modifying the window manager.

Figure 3:
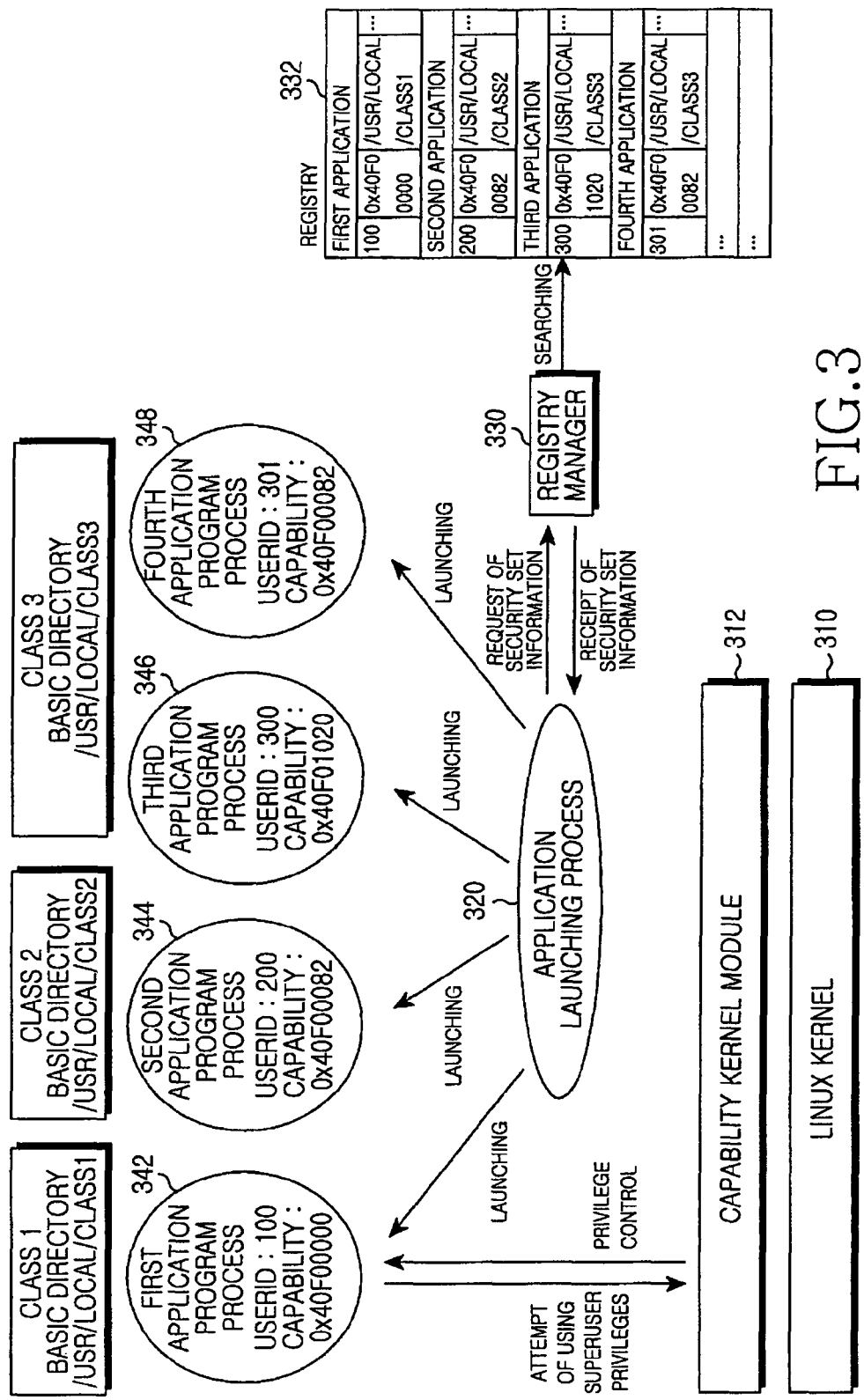
FIG. 3 is a diagram illustrating an environment in which an application launching processor is executed according to an embodiment of the present invention.

FIG. 3 is a diagram illustrating environment in which an application launching processor is executed according to an embodiment of the present invention.

Referring to FIG. 3, an application launching processor 320 requests a registry manager 330 for security set information on an application program in order to launch the application program and receives the security set information from the registry manager 330. The registry manager 330 is a resident processor in order to manage information stored in a registry 332. Generally, the registry manager 330 is implemented as a daemon called gconfd in a Linux operation system.

The registry 332 is a database (DB) storing information on application programs. As illustrated in FIG. 3, the registry 332 may store various information as well as security set information on application programs.

The security set information includes a user identification (ID) associated with an application program, a capability, and a basic directory. For example, in a first application stored in the registry 332 in FIG. 3, a first field stores a user ID of '100', a second field stores a capability of '0x40f00000', and a third field stores a basic directory of '/usr/local/class1'.

The capability is the property of a processor based on which a Linux capability system adjusts the privileges of the processor. The Linux capability system assigns part of superuser privileges to a user processor. That is, a capability assigned to the user processor indicates privileges which the user processor exercises. A capability kernel module controls the operations of the user processor based on the capability assigned to the user processor. The following Table 1 is a list of capabilities as defined in the Linux kernel 2.2.13. They are taken from the kernel source in . . . include/linux/capability.h.

TABLE 1

| NAME | NUMBER | DESCRIPTION |
| --- | --- | --- |
| CAP_CHOWN | 0 | Override restrictions on changing file ownership |
| CAP_DAC_OVERRIDE | 1 | Override access restriction on files |
| CAP_DAC_READ_SEARCH | 2 | Override restrictions on read and search of files and directories |

TABLE 1-continued

| NAME | NUMBER | DESCRIPTION |
|---|---|---|
| CAP_FOWNER | 3 | Override restrictions on files when owned by processes |
| CAP_FSETID | 4 | Allow setting setuid bits (not implemented) |
| CAP_KILL | 5 | Allow sending signals to processes owned by others |
| CAP_SETGID | 6 | Allow group ID manipulation |
| CAP_SETUID | 7 | Allow user id manipulation |
| CAP_SETPGAP | 8 | Transfer capabilities to other processes |
| CAP_LINUX_IMMUTABLE | 9 | Allow modification of immutable and append-only file attributes |
| CAP_NET_BIND_SERVICE | 10 | Allow binding to sockets below 1024 |
| CAP_NET_BROADCAST | 11 | Allow network broadcasting and multicast access |
| CAP_NET_ADMIN | 12 | Allow net admin tasks - interfaces, firewalls, routing, . . . |
| CAP_NET_RAW | 13 | Allow use of raw sockets |
| CAP_IPC_LOCK | 14 | Allow locking of memory segments |
| CAP_IPC_OWNER | 15 | Override IPC ownership checks |
| CAP_SYS_MODULE | 16 | Insert and remove kernel modules |
| CAP_SYS_RAWIO | 17 | Allow access to ioperm and iopl |
| CAP_SYS_CHROOT | 18 | Allow use of chroot( ) |
| CAP_SYS_PTRACE | 19 | Allow tracing of any process |
| CAP_SYS_PACCT | 20 | Allow configuration of process accounting |
| CAP_SYS_ADMIN | 21 | Many sys admin tasks: mount, quotas, swapping, much more |
| CAP_SYS_BOOT | 22 | Allow rebooting the system |
| CAP_SYS_NICE | 23 | Allow raising priority, setting other process priority |
| CAP_SYS_RESOURCE | 24 | Override resource limits |
| CAP_SYS_TIME | 25 | Allow changing the system clock |
| CAP_SYS_TTY_CONFIG | 26 | Allow configuration of tty devices |

For example, when a first application program processor 342 attempts to gain access to a Linux kernel 310 in order to execute an operation restricted under the superuser privileges, a capability kernel module 312 determines if the first application program processor 342 is assigned with a superuser privilege for executing the operation, and controls the access to the Linux kernel 310 depending on the result of the determination.

The application launching processor 320 may transmit identification information on an application program selected by a user to the registry manager 330 in order to request security set information on the application program. In one embodiment, a user identification (ID) associated with the application program may be used as the identification information since different user IDs are assigned to application programs, respectively. The application launching processor 320 may map a user selection to a user ID using a mapping table. Description of the mapping table will be described below with reference to FIG. 4.

In response to the request of the application launching processor 320, the registry manager 330 searches the security set information on the application program from the registry 332 and transmits the security set information to the application launching processor 320. The application launching processor 320 launches the application program according to the security set information. Each application program that has a corresponding capability indicating execution privileges is executed with a corresponding user ID and on a corresponding basic directory.

The basic directory is a root directory of a file system, which a corresponding application program processor recognizes. Different basic directories are assigned to the first application program processor 342 and the second application program processor 344, respectively. One basic directory is assigned to the third application program processor 346 and the fourth application program processor 348.

Figure 4:
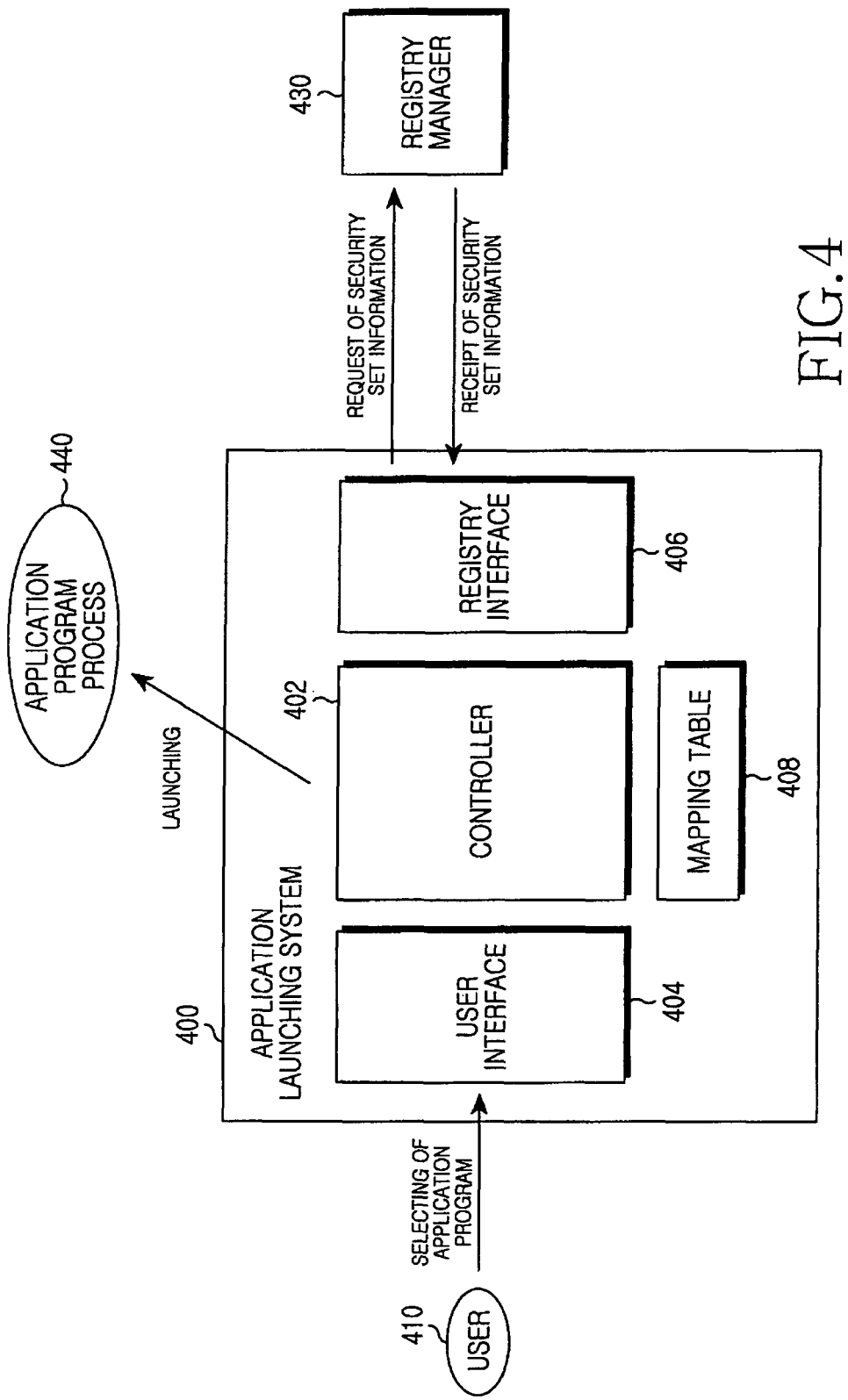
FIG. 4 is a block diagram of an application launching processor according to an embodiment of the present invention.

FIG. 4 is a block diagram of an application launching processor according to an embodiment of the present invention.

An application launching processor 400 executing an application launching processor includes a controller 402, a user interface 404, a registry interface 406, and a mapping table 408. The user interface 404 receives information on an application program selected by a user 410. Based on the received information, the registry interface 406 requests from a registry manager 430 security set information on the application program. In the request, the registry interface 406 also transmits identification (ID) information on the application program to the registry manager 430. In one embodiment, a user ID associated with the application program may be used as the identification information. The mapping table 408 searches the user ID using, for example, an icon selected by the user 410.

The registry interface 406 receives the security set information from the registry manager 430 and sets a user account, a capability, and a basic directory based on the received security set information to launch the application program.

Figure 5:
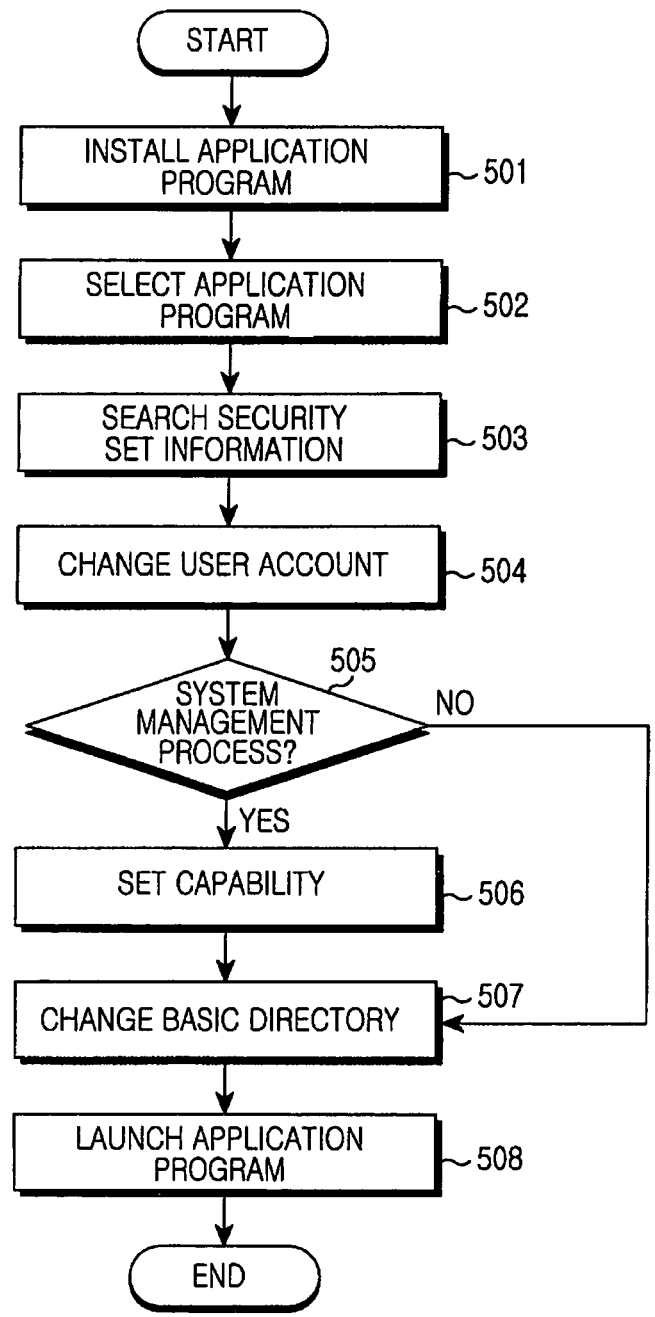
FIG. 5 is a flowchart illustrating a procedure for launching an application program according to an embodiment of the present invention.

FIG. 5 is a flowchart illustrating a procedure for launching an application program according to an embodiment of the present invention.

In step 501, an application program is installed. The installation of the application program will be described with reference to FIG. 6.

Figure 6:
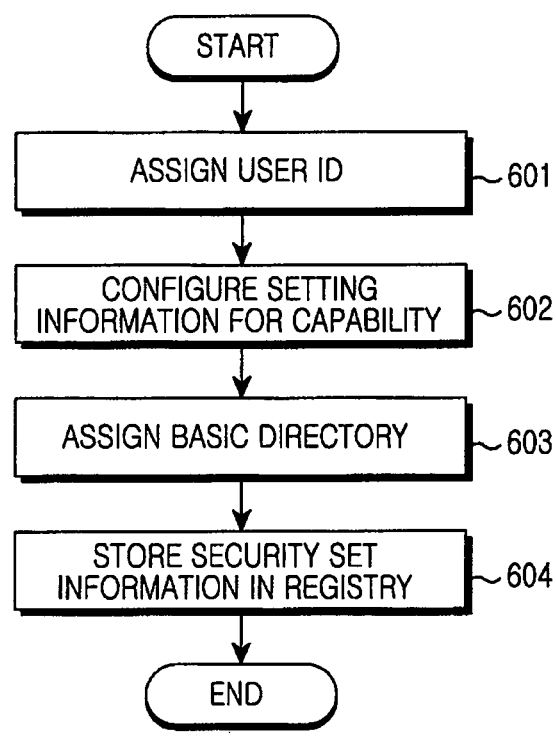
FIG. 6 is a flowchart illustrating a procedure for installing an application program according to an embodiment of the present invention.

FIG. 6 is a flowchart illustrating a procedure for installing an application program according to an embodiment of the present invention. The installation procedure may be performed by a separate installation processor. Referring to FIG. 6, in step 601, a user ID is assigned to an application program to be installed. The assigned user ID is different from existing user IDs assigned to preinstalled application programs. In embedded systems, since the number of application programs to be launched is relatively small, different user IDs may be assigned to application programs, respectively. Each application program is executed in a manner in which application programs are executed by corresponding users, respectively. Also each application program processor can be executed independently, as in a multi-user environment. Moreover, different user accounts are assigned to application program processors, respectively, so that the above described secure method according to the present invention is designed based on a user ID assigned to an application program.

In step 602, setting information for a capability assigned to the application program processor is configured. The installation processor determines which superuser privileges are required to execute the application program and configures the setting information in order to set the capability corresponding to the required privileges. In the processor of launching the application program, an application launching processor may set the capability for the application program processor using the configured setting information.

In step 603, the installation processor assigns a basic directory to the application program processor. As described above, different basic directories can be assigned to application program processors, respectively, or one basic directory can be assigned to a plurality of application program processors. Thus, the installation processor assigns a share basic directory or a separate basic directory depending on the characteristics of the application program. As a result, each application program processor has part of superuser privileges, but cannot access files related to the operations of the embedded system, so that the embedded system can be protected from an attack application program and damage due to external attacks can be limited to attacked application programs.

In addition, a basic directory is isolated from other application program processors that belong to other directories, so that it can be prevented that undesired files are modified and changed. Accordingly, security between application program processors can be improved and damage due to viruses can be minimized.

In step 604, the security set information including the user ID, the capability, and the basic directory is stored in a registry. The security set information stored in the registry will be used in the processor of launching the installed application program.

Again referring to FIG. 5, in step 502, a user selects an application program to be launched. In one embodiment, the selection of the application program may be made through a user interface implemented in a GUI.

In step 503, a registry interface searches security set information on the selected application program from the registry through a registry manager. The security set information includes a user ID associated with the selected application program, a capability, and a basic directory. In step 504, a controller changes a user account for an application program processor to the user ID in the security set information. In one embodiment, the controller may change the user account for the application program processor using a setuid( ) command of a Linux system.

In step 505, the application launching processor determines whether the application program processor is a system management processor. A system management processor is a processor that needs part of the superuser privileges. The determination may be made based on the setting information for the capability in the security set information. If the application program processor is not a system management processor, since the application program processor does not need part of the superuser privileges, the step 506 of setting the capability can be omitted. According to the present invention, all application program processors are created as child processors of the application launching processor using a fork( ) command, and a Linux kernel creates new processors based on a default capability. Thus, when the application program processor is not the system management processor, the application program processor can be launched without the processor of setting the capability.

If the application program processor is a system management processor, since the application program processor needs part of the superuser privileges, the controller, in step 506, sets the capability based on the setting information for the capability in the security set information.

In step 507, the controller changes a basic directory of the application program processor according to the basic directory in the security set information. In step 508, the controller launches the application program. In the processor of changing the basic directory, the controller may use a chroot ( ) command of the Linux system.

The above described application program launching method for improving the security of the embedded Linux kernel can be implemented by a computer-readable recording medium of a computer-readable code. The computer-readable recording medium is a recording medium for storing data that can be read by computer systems. The computer-readable recording medium includes a ROM, a RAM, a CD-ROM, a magnetic tape, a floppy disk, and an optical data storage device. In addition, a carrier wave (e.g., transmission through Internet) is the computer-readable recording medium. Moreover, the computer-readable recording medium can be distributed among computer systems that are interconnected through a network and stored in computer-readable codes.

According to the present invention applied to the embedded systems used by one user, the application program processor is executed in the manner in which each application program processor is executed by a respective user, so that the embedded Linux system can be configured using conventional Linux system security functions.

In the present invention, the role of a superuser in the Linux system is minimized and the processor of an application program is executed independently, thereby minimizing damage due to external attacks.

The present invention provides the security method optimized for the embedded system based on the Linux operating system, so that the security of the embedded system is improved and a general-purpose operating system such as the Linux operating system is easily applied to the embedded systems.

The present invention improves security of the embedded system in a cost effective manner by providing the method for applying security method based on the multi-user environment used in the general-purpose operating system to the embedded system without modifying the security method to a large extent.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method for launching an application program on an embedded Linux kernel, the method comprising:
   installing the application program;
   in response to receiving a request to launch the application program using a user account, searching security set information on the application program selected by a user;
   changing the user account for a processor of the application program to a user identification associated with the application program in the security set information;

setting a capability for the processor according to setting information for the capability in the security set information; and launching the application program, wherein installing the application program comprises:
   assigning the user identification to the application program to be installed;
   configuring the setting information for the capability required by the application program; and
   storing the security set information including the user identification and the capability in a registry, and wherein searching the security set information comprises searching the security set information on the application program from a registry storing the security set information including the capability and the user identification associated with the application program.

2. The method of claim 1, wherein searching the security set information comprises using the user identification associated with the application program as identification information for searching the security set information on the application program from the registry.

3. The method of claim 1, further comprising, before launching the application program, changing a basic directory of the processor according to a basic directory in the security set information.

4. The method of claim 1, wherein setting the capability comprises:
   determining if the processor is a system management processor; and
   setting the capability for the processor according to the setting information for the capability in the security set information when the processor is the system management processor.

5. The method of claim 4, wherein setting the capability further comprises changing a basic directory of the processor according to a basic directory in the security set information when the processor is not the system management processor.

6. The method of claim 1, wherein the user identification is unique to the application program, and wherein the application program is launched on an embedded Linux kernel.

7. The method of claim 1, wherein installing the application program further comprises, before storing the security set information, assigning a basic directory for the application program, wherein the security set information further includes the basic directory.

8. The method of claim 1, wherein the user identification is unique to the application program.

9. An apparatus for launching an application program on an embedded Linux kernel, the apparatus comprising:
   an application program installer configured to assign a user identification to the application program to be installed, detect the security set information on the application program to be installed, search the security set information on the application program from a registry storing the security set information including a capability required by the application program and the user identification associated with the application program, configure setting information for the capability required by the application program, and store the detected security set information in the registry for a processor of the application program;
   a user interface configured to receive a request to launch the application program selected by a user using a user account;
   a registry interface configured to search, in response to the request being received, security set information on the application program from a registry by communicating with a registry manager; and
   a controller configured to change the user account for a processor of the application program to the user identification associated with the application program in the security set information, set the capability and a basic directory according to the security set information, and launch the processor of the application program.

10. The apparatus of claim 9, further comprising a mapping table configured to map the application program selected by the user to a user identification associated with the application program.

11. The apparatus of claim 9, wherein the registry interface is configured to use a user identification associated with the application program as identification information for identifying the application program to communicate with the registry manager.

12. The apparatus of claim 9, wherein the user interface is implemented in a graphical user interface, and wherein the application program is launched on an embedded Linux kernel.

13. A non-transitory computer-readable recording medium storing a program for executing a method for launching an application program on an embedded Linux kernel, the method comprising:
   installing the application program;
   in response to receiving a request to launch the application program using a user account, searching security set information on the application program selected by a user;
   changing the user account for a processor of the application program to a user identification associated with the application program in the security set information;
   setting a capability for the processor according to setting information for the capability in the security set information;
   changing a basic directory for the processor according to a basic directory in the security set information; and
   launching the application program, wherein installing the application program comprises:
   assigning the user identification to the application program to be installed;
   configuring setting information for the capability required by the application program; and
   storing the security set information including the user identification and the capability in a registry, and wherein searching the security set information comprises searching the security set information on the application program from a registry storing the security set information including the capability and the user identification associated with the application program.

14. The non-transitory computer-readable recording medium of claim 13, the method further comprising, before launching the application program, changing a basic directory of the processor according to a basic directory in the security set information, wherein the application program is launched on an embedded Linux kernel.

15. The non-transitory computer-readable recording medium of claim 13, wherein setting the capability comprises:
   determining if the processor is a system management processor;
   setting the capability for the processor according to the setting information for the capability in the security set information when the processor is the system management processor; and changing a basic directory of the processor according to a basic directory in the security set information when the processor is not the system management processor.

16. The apparatus of claim 9, wherein the application program installer is configured to, before storing the security set information, assign a basic directory for the application program, wherein the security set information further includes the basic directory.

17. The apparatus of claim 9, wherein in setting the capability the controller is further configured to determine if the processor is a system management processor, and set the capability for the processor according to the setting information for the capability in the security set information when the processor is the system management processor.

18. The apparatus of claim 17, wherein in setting the capability the controller is further configured to change a basic directory of the processor according to a basic directory in the security set information when the processor is not the system management processor.

* * * * *